(12) United States Patent
Mori

(10) Patent No.: US 9,628,470 B2
(45) Date of Patent: *Apr. 18, 2017

(54) CLIENT DEVICE, NON-TRANSITORY STORAGE MEDIUM STORING INSTRUCTIONS EXECUTABLE BY THE CLIENT DEVICE, AND SERVICE PERFORMING SYSTEM

(71) Applicant: BROTHER KOGYO KABUSHIKI KAISHA, Nagoya-shi, Aichi-ken (JP)

(72) Inventor: Takafumi Mori, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 140 days.

This patent is subject to a terminal disclaimer.

(21) Appl. No.: 14/722,540

(22) Filed: May 27, 2015

(65) Prior Publication Data
US 2015/0349965 A1 Dec. 3, 2015

(30) Foreign Application Priority Data
May 29, 2014 (JP) ................................. 2014-111795

(51) Int. Cl.
H04L 9/32 (2006.01)
H04L 29/06 (2006.01)

(52) U.S. Cl.
CPC ........ H04L 63/0823 (2013.01); H04L 9/3268 (2013.01)

(58) Field of Classification Search
CPC .......................... H04L 9/3268; H04L 63/0823
See application file for complete search history.

(56) References Cited

U.S. PATENT DOCUMENTS

2004/0187009 A1* 9/2004 Ebata ..................... G06F 21/32
713/185
2007/0234045 A1* 10/2007 Ishiyama ............ H04L 63/0823
713/158

(Continued)

FOREIGN PATENT DOCUMENTS

JP 2006-239930 A 9/2006

*Primary Examiner* — Jung Kim
*Assistant Examiner* — James J Wilcox
(74) *Attorney, Agent, or Firm* — Scully, Scott, Murphy & Presser, PC

(57) ABSTRACT

A client device communicates with a server and a relay device and includes a controller and a storage. The controller is configured to: receive service use information from the relay device; use the received service use information to transmit connection request information to the server; receive the server certificate data which is transmitted from the server as a response to the connection request information; determine whether certificate-authority certificate data for verification of server certificate data is stored in the storage; when the certificate-authority certificate data is stored in the storage, verify the server certificate data using the certificate-authority certificate data; when the certificate-authority certificate data is not stored in the storage, receive the certificate-authority certificate data from the relay device; verify the server certificate data using the received certificate-authority certificate data; and store the received certificate-authority certificate data into the storage.

13 Claims, 8 Drawing Sheets

(56) References Cited

U.S. PATENT DOCUMENTS

| | | | |
|---|---|---|---|
| 2007/0234059 A1* | 10/2007 | Ohara | H04L 63/0823 713/176 |
| 2008/0082677 A1* | 4/2008 | Miyazawa | G06Q 20/40 709/229 |
| 2008/0086642 A1* | 4/2008 | Takahashi | H04L 9/3247 713/176 |
| 2010/0023773 A1* | 1/2010 | Todaka | G06F 21/608 713/176 |
| 2010/0185858 A1* | 7/2010 | Nishimi | H04L 63/08 713/168 |
| 2012/0113464 A1* | 5/2012 | Inoue | H04N 1/00151 358/1.15 |
| 2013/0044343 A1* | 2/2013 | Matsugashita | G06F 3/1222 358/1.14 |
| 2013/0070780 A1* | 3/2013 | Hozumi | H04B 7/15542 370/437 |
| 2015/0089215 A1* | 3/2015 | Hattori | H04L 9/321 713/156 |
| 2016/0094730 A1* | 3/2016 | Nakamura | H04N 1/00209 358/1.15 |

* cited by examiner

FIG.2A

| SERVICE ID | INTERFACE DEFINITION FILE | ACCESS URL |
|---|---|---|
| 001 | DEFINITION FILE 001 | URL001 |
| 002 | DEFINITION FILE 002 | URL002 |

| KEY INFORMATION | CA CERTIFICATE DATA |
|---|---|
| AAA | CA CERTIFICATE DATA A |
| BBB | CA CERTIFICATE DATA B |
| ... | ... |

| KEY INFORMATION | SERVICE ID | CA CERTIFICATE DATA | LAST ACCESS DATE AND TIME |
|---|---|---|---|
| | | | |
| | | | |
| | | | |

| KEY INFORMATION | CA CERTIFICATE DATA |
|---|---|
| AAA | CA CERTIFICATE DATA A |
| BBB | CA CERTIFICATE DATA B |
| ... | ... |

| KEY INFORMATION | SERVICE ID | CA CERTIFICATE DATA |
|---|---|---|
| CCC | 101 | CA CERTIFICATE DATA C |
| DDD | 102 | CA CERTIFICATE DATA D |
| ... | ... | ... |

67

CLIENT DEVICE, NON-TRANSITORY STORAGE MEDIUM STORING INSTRUCTIONS EXECUTABLE BY THE CLIENT DEVICE, AND SERVICE PERFORMING SYSTEM

CROSS REFERENCE TO RELATED APPLICATION

The present application claims priority from Japanese Patent Application No. 2014-111795, which was filed on May 29, 2014, the disclosure of which is herein incorporated by reference in its entirety.

BACKGROUND

Technical Field

The following disclosure relates to a client device configured to verify server certificate data acquired from a server device, a non-transitory storage medium storing a plurality of instructions executable by a processor of the client device, and a service performing system.

Description of the Related Art

There has been known a technique of communication using Secure Sockets Layer (SSL) between a server device for providing a service and a client device which uses the service. SSL effectively prevents communication with a device having spoofed the server device and also prevents eavesdropping and tampering of data transferred between the client device and the server device.

Specifically, before using the service provided by the server device, the client device acquires server certificate data from the server device, verifies the server certificate data by using Certification Authority (CA) certificate data issued by CA, and sends the server device a pre-master-secret value encrypted using a public key contained in the verified server certificate data. This pre-master-secret value is used to encrypt data to be transferred between the client device and the server device.

The number of CA certificate data stored in a storage device of the client device increases with increase in the number of services used by the client device. This increase may unfortunately result in a storage area of the client device being cluttered with the CA certificate data. This problem is caused in particular in the client device having a storage area of a small size.

Accordingly, an aspect of the disclosure relates to a client device capable of using a multiplicity of services without a storage area being cluttered with CA certificate data, a non-transitory storage medium storing a plurality of instructions executable by a processor of the client device, and a service performing system.

In one aspect of the disclosure, a client device includes: a communication device configured to be electrically connected with (i) a server configured to provide a service and (ii) a relay device; a storage; and a controller. The controller is configured to execute: a first reception process for receiving service use information from the relay device via the communication device; a first transmission process for using the service use information received in the first reception process, to transmit connection request information to the server via the communication device; a second reception process for receiving, via the communication device, the server certificate data which is transmitted from the server as a response to the connection request information; a determination process for determining whether certificate-authority certificate data is stored in the storage, the certificate-authority certificate data being for verification of server certificate data which is provided by the server; a first verification process for verifying the server certificate data using the certificate-authority certificate data when the controller determines in the determination process that the certificate-authority certificate data is stored in the storage; a third reception process for receiving the certificate-authority certificate data from the relay device via the communication device when the controller determines in the determination process that the certificate-authority certificate data is not stored in the storage; a second verification process for verifying the server certificate data using the certificate-authority certificate data received in the third reception process; and a storage control process for storing the certificate-authority certificate data received in the third reception process, into the storage.

In one aspect of the disclosure, a client device includes: a communication device configured to be electrically connected with a server and a relay device; a storage; a controller; and a plurality of servers each as the server. The plurality of servers are configured to respectively provide a plurality of services different from each other. The plurality of servers include a first server and a second server different from the first server. The plurality of services include: a first service provided by the first server and accepted by the relay device in advance; and a second service provided by the second server and not accepted by the relay device in advance. The storage includes a first storage area and a second storage area different from the first storage area. The controller is configured to: store, in the storage, certificate-authority certificate data for verification of server certificate data which is provided by the server; store first certificate-authority certificate data in the first storage area; and store second certificate-authority certificate data in the second storage area. The first certificate-authority certificate data is for verification of first server certificate data provided by the first server. The second certificate-authority certificate data is for verification of second server certificate data provided by the second server. The controller is configured to execute: a first reception process for receiving service use information from the relay device via the communication device; a first transmission process for using the service use information received in the first reception process, to transmit connection request information to the server via the communication device; a second reception process for receiving, via the communication device, the server certificate data which is transmitted from the server as a response to the connection request information; and a verification process for verifying the server certificate data received in the second reception process, using the certificate-authority certificate data stored in the storage. The controller is configured to: use the certificate-authority certificate data stored in the first storage area to verify the first server certificate data in the verification process, when the controller receives the service use information corresponding to the first service in the first reception process; and use the certificate-authority certificate data stored in the second storage area to verify the second server certificate data in the verification process, when the controller receives the service use information corresponding to the second service in the first reception process.

In one aspect of the disclosure, a non-transitory storage medium stores a plurality of instructions executable by a processor of a client device. The client device includes: a communication device configured to be electrically connected with (i) a server configured to provide a service and (ii) a relay device; and a storage. The plurality of instructions, when executed by the processor, cause the client device to execute: a first reception process for receiving service use information from the relay device via the communication device; a first transmission process for using the service use information received in the first reception process, to transmit connection request information to the server via the communication device; a second reception process for receiving, via the communication device, the server certificate data which is transmitted from the server as a response to the connection request information; a determination process for determining whether certificate-authority certificate data is stored in the storage, the certificate-authority certificate data being for verification of server certificate data which is provided by the server; a first verification process for verifying the server certificate data using the certificate-authority certificate data when the client device determines in the determination process that the certificate-authority certificate data is stored in the storage; a third reception process for receiving the certificate-authority certificate data from the relay device via the communication device when the client device determines in the determination process that the certificate-authority certificate data is not stored in the storage; a second verification process for verifying the server certificate data using the certificate-authority certificate data received in the third reception process; and a storage control process for storing the certificate-authority certificate data received in the third reception process, into the storage.

In one aspect of the disclosure, a service performing system includes: a server configured to provide a service; a client device configured to use the service; and a relay device. The client device includes: a communication device configured to be electrically connected with the server and the relay device; a storage; and a controller. The controller is configured to execute: a first reception process for receiving service use information from the relay device via the communication device; a first transmission process for using the service use information received in the first reception process, to transmit connection request information to the server via the communication device; a second reception process for receiving, via the communication device, the server certificate data which is transmitted from the server as a response to the connection request information; a determination process for determining whether certificate-authority certificate data is stored in the storage, the certificate-authority certificate data being for verification of server certificate data which is provided by the server; a first verification process for verifying the server certificate data using the certificate-authority certificate data when the controller determines in the determination process that the certificate-authority certificate data is stored in the storage; a third reception process for receiving the certificate-authority certificate data from the relay device via the communication device when the controller determines in the determination process that the certificate-authority certificate data is not stored in the storage; a second verification process for verifying the server certificate data using the certificate-authority certificate data received in the third reception process; and a storage control process for storing the certificate-authority certificate data received in the third reception process, into the storage.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which:

FIGS. 2A-2C are views illustrating one example of a data structure of a data storage area of a multi-function peripheral (MFP), wherein FIG. 2A illustrates a service-use-information storage area, FIG. 2B illustrates a first storage area, and FIG. 2C illustrates a second storage area;

FIGS. 3A and 3B are views illustrating a data structure of a data storage area of a relay device, wherein FIG. 3A illustrates a first storage area, and FIG. 2B is a second storage area;

DETAILED DESCRIPTION OF THE EMBODIMENT

Hereinafter, there will be described embodiment by reference to the drawings. It is to be understood that the following embodiment is described only by way of example, and the disclosure may be otherwise embodied with various modifications without departing from the scope and spirit of the disclosure.

Figure 1:
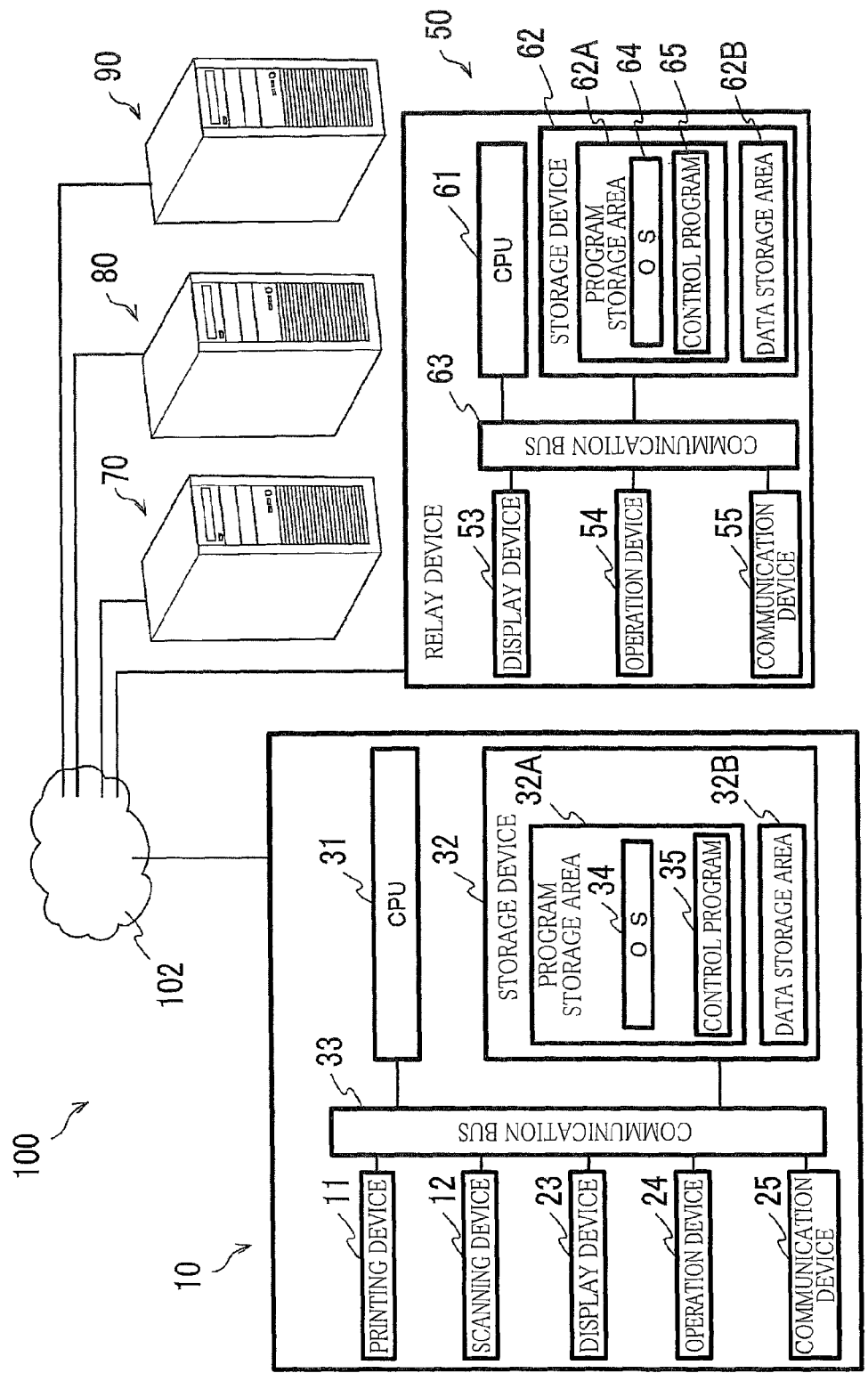
FIG. 1 is a block diagram illustrating a service performing system according to one embodiment.

FIG. 1 illustrates a service performing system 100 according to the present embodiment. This service performing system 100 includes a multi-function peripheral (MFP) 10, a relay device 50, and server devices 70, 80, 90. The MFP 10, the relay device 50, and the server devices 70-90 are communicable with each other over a communication network 102. Any network may be used as the communication network 102, examples of which include the Internet, a mobile communication network, a wired Local Area Network (LAN), a wireless LAN, and a combination of at least some of these networks. In the present embodiment, the MFP 10 is connected to a LAN, and the relay device 50 and the server devices 70-90 to the Internet.

The LAN is connected to the Internet via a router, not shown. This router serves as a firewall. That is, when a request is transmitted from the MFP 10 to the relay device 50 or any one of the server devices 70-90 and when a response is transmitted from the relay device 50 or any one of the server devices 70-90 to the MFP 10, the router allows these request and response to pass through it. When a request is transmitted from the relay device 50 or the server devices 70-90 to the MFP 10, on the other hand, the router inhibits the request from passing through it.

Connection may be established between the MFP 10 and the relay device 50 using Extensible Messaging and Presence Protocol Over Bidirectional-Streams Over Synchronous HTTP (XMPP over BOSH). With this establishment, the request transmitted from the relay device 50 can be received by the MFP 10 via the router.

XMPP over BOSH is a protocol which always maintains a state in which connection is established. However, the protocol for establishing connection between the MFP 10 and the relay device 50 is not limited to XMPP over BOSH. Examples of such protocol include protocols for establishing connection, protocols for continuous connection, and protocols for maintaining connection.

MFP 10

As illustrated in FIG. 1, the MFP 10 includes a printing device 11, a scanning device 12, a display device 23, an operation device 24, a communication device 25, a central processing unit (CPU) 31, a storage device 32, and a communication bus 33. The devices of the MFP 10 are connected to each other by the communication bus 33. The MFP 10 is one example of an image recording apparatus or a client device configured to use a service provided by the server devices 70-90. Any device may be used as the client device, examples of which include: specialized machines such as a printer, a label printer, a scanner, a facsimile machine, a sewing machine, and a machine tool; mobile terminals such as a smartphone, a mobile phone, and a tablet computer; and a personal computer (PC).

Printing Device 11 and Scanning Device 12

The printing device 11 records an image on a recording sheet based on image data. The printing device 11 may be a well-known printing device such as an ink-jet printing device or an electronic photographic printing device. The scanning device 12 performs a scanning operation for creating image data by reading an image recorded on a recording sheet. The MFP 10 may further have other functions including: a facsimile function for transmitting and receiving facsimiles; and a copying function for reading an image recorded on a recording sheet and recording the image on another recording sheet.

Display Device 23

The display device 23 includes a display screen for displaying various kinds of information thereon. The display device 23 may be constituted by any device such as a liquid crystal display (LCD) and an organic electroluminescent display (OELD).

Operation Device 24

The operation device 24 receives or accepts a user operation for selecting an object displayed on the display screen of the display device 23. Specifically, the operation device 24 includes push buttons, for example, and sends the CPU 31 a signal corresponding to a pushed one of the push buttons. The operation device 24 may further include a touch sensor shaped like a thin layer superposed on the display screen of the display device 23. That is, the display device 23 may be constituted as a touch panel display. The touch sensor may be constituted by a well-known sensor such as a capacitance sensor and a resistive film sensor.

It is noted that the object is an image selectable by the user operating the operation device 24. For example, the MFP 10 may be configured such that each of objects is a character string displayed on the display device 23, one of the displayed objects is highlighted by a push of a direction key of the operation device 24, and the highlighted object is selected by a push of a determination button of the operation device 24. As another example, in the case where the operation device 24 is a touch panel, the object may be an icon, a button, or a link displayed on the display device 23, for example, and the user may touch the object to select it.

Communication Device 25

The communication device 25 is an interface for communicating with external devices over the communication network 102. That is, the MFP 10 outputs various kinds of information to the relay device 50 or the server devices 70-90 via the communication device 25 and receives various kinds of data or information from the relay device 50 or the server devices 70-90 via the communication device 25.

CPU 31

The CPU 31 controls operations of the MFP 10. The CPU 31 acquires various programs (which will be described below) from the storage device 32 and executes them, based on information output from the operation device 24 and information acquired from the external device via the communication device 25. In view of the above, the CPU 31 and the storage device 32 are one example of a controller.

Storage Device 32

The storage device 32 includes a program storage area 32A and a data storage area 32B. The program storage area 32A stores an operating system (OS) 34 and a control program 35. It is noted that the control program 35 may be a single program and may be a collection of a plurality of programs. The data storage area 32B stores data and/or information required for execution of the control program 35.

In the present specification, the term "data" and the term "information" are the same in that each of them is a bit or a bit string which can be handled by a computer. The data can be handled by the computer regardless of details indicated by each bit. The information causes branching in an operation of the computer depending on details indicated by each bit. Moreover, the term "instruction" is a control signal for demanding next operation to a device to which the instruction is transmitted, and may include the information or may have a nature of the information.

Also, even if the data and the information are changed in format (e.g., a text format, a binary format, and a flag format) for each computer, the computer treats the data before the change and the data after the change as the same data as long as the computer recognizes that the data before the change and the data after the change are substantially the same as each other. For example, information indicating "two" may be stored in one computer as information in a text format of "0x32" in the ASCII code and stored in another computer as information in a binary format of "10" as a binary number.

However, the data and the information are not strictly distinguished and may be treated exceptionally. For example, the data may be temporarily treated as the information, and the information may be temporarily treated as the data. Also, the data treated in one device may be treated as the information in another device, and vice versa. Furthermore, the information may be taken out from the data, and the data from the information.

The storage device 32 is, for example, constituted by a random access memory (RAM), a read only memory (ROM), an electrically erasable programmable read-only memory (EEPROM), a hard disk drive (HDD), a buffer for the CPU 31, and other similar devices, or constituted by a combination of at least two of these devices.

The storage device 32 may be a storage medium readable by a computer. The storage medium readable by a computer is a non-transitory medium. Examples of the non-transitory medium also include recording media such as a CD-ROM and a DVD-ROM. The non-transitory medium is also a tangible medium. However, an electrical signal for transmitting programs downloaded from, e.g., a server on the Internet is a signal medium readable by the computer as one kind of a medium readable by the computer but is not a non-transitory storage medium readable by the computer.

Programs stored in the program storage area 32A are executed by the CPU 31. However, in the present specification, an operation of each of the programs may be described without referring to the CPU 31. That is, the description meaning that "a program A executes a processing A" may indicate that "the CPU 31 executes the processing A written in the program A". This applies to the relay device 50 which will be described below.

The OS 34 is a basic program which provides an application programming interface (API) for controlling hardware constituting the MFP 10 such as the printing device 11, the scanning device 12, the display device 23, the operation device 24, and the communication device 25. That is, each of the above-mentioned programs controls the hardware by calling up the API provided by the OS 34. However, in the present specification, operations of the programs will be described without referring to the OS 34. That is, the description described later meaning that "program B controls hardware C" may indicate that "the program B controls the hardware C through the API of the OS 34". This applies to the relay device 50 described later.

As illustrated in FIGS. 2A-2C, the data storage area 32B includes a service-use-information storage area 36 illustrated in FIG. 2A, a first storage area 37 illustrated in FIG. 2B, and a second storage area 38 illustrated in FIG. 2C. Each of the service-use-information storage area 36 and the first storage area 37 is constituted by a non-transitory ROM, for example. The second storage area 38 is constituted by a transitory RAM, for example. However, each of the storage areas 36-38 may have a different structure. Data and information stored in the storage areas 36-38 will be explained later in detail.

Relay Device 50

As illustrated in FIG. 1, the relay device 50 includes a display device 53, an operation device 54, a communication device 55, a CPU 61, a storage device 62, and a communication bus 63. Each of the display device 53, the operation device 54, the communication device 55, the CPU 61, the storage device 62, and the communication bus 63 of the relay device 50 has the same structure as that of a corresponding one of the display device 23, the operation device 24, the communication device 25, the CPU 31, the storage device 32, and the communication bus 33 of the MFP 10, and an explanation of which is dispensed with. The CPU 61 and the storage device 62 are another example of the controller. The storage device 62 has a program storage area 62A and a data storage area 62B. The program storage area 62A stores an OS 64 and a control program 65. The data storage area 62B has a first storage area 66 illustrated in FIG. 3A and a second storage area 67 illustrated in FIG. 3B. Data and the information stored in the storage areas 66, 67 will be explained later in detail.

Server Devices 70, 80, 90

Each of the server devices 70, 80, 90 provides or offers services to be used by the MFP 10. Each of the server devices 70, 80 is one example of a particular server device authorized by an administrator of the relay device 50. Each service provided by the server devices 70, 80 will be hereinafter referred to as "particular service". Any device may be employed as each of the server devices 70, 80, examples of which include a device for providing services such as Dropbox (registered trademark), Google Docs (registered trademark), and Evernote (registered trademark). The server device 90 is one example of an external server device different from the particular server device. Each service provided by the server device 90 will be hereinafter referred to as "external service".

Any service may be provided by the server devices 70-90, examples of which include a cloud print processing, a Scan-to-Cloud processing, and a device-information collecting processing. The cloud print processing is a processing in which the MFP 10 receives image data stored in one of the server devices 70-90 and controls the printing device 11 to record an image based on the received image data. The Scan-to-Cloud processing is a processing in which the scanning device 12 performs a scan operation and transmits image data created in the scan operation, to one of the server devices 70-90. The device-information collecting processing is a processing in which the MFP 10 transmits device information thereabout to one of the server devices 70-90. Examples of the device information include: the number of recording sheets on which images have been recorded by the printing device 11; and a remaining amount of ink in an ink cartridge mounted in the printing device 11.

The data or information transmitted and received in the service provided by any of the server devices 70-90 is encrypted according to Secure Sockets Layer (SSL). In the cloud print processing, for example, the server device transmits encrypted image data to the MFP 10, In the Scan-to-Cloud processing, for example, the MFP 10 transmits encrypted image data to the server device. In the device-information collecting processing, for example, the MFP 10 transmits encrypted device information to the server device.

The service-use-information storage area 36 illustrated in FIG. 2A stores particular service use information for use of the particular service provided by any one of the server devices 70, 80. The service use information identified by the service ID "001" is information for use of the service provided by the server device 70, for example. The service use information identified by the service ID "002" is information for use of the service provided by the server device 80, for example. The particular service use information includes: a service ID which identifies a particular service; an interface definition file; and an access uniform resource locator (URL). The same kind of information is contained in external service use information which will be described below. The particular service use information and the external service use information are one example of the service use information.

The service ID is an identifier for uniquely identifying a service. Each service ID is assigned to a corresponding one of the services by, e.g., the administrator of the relay device 50. The service ID is one example of the service identifier. The interface definition file defines service icons to be contained and displayed on a service list display screen. When pressed by a user of the MFP 10, each service icon receives a service use instruction for starting use of a corresponding one of the services. The interface definition file is described in, e.g., Hyper Text Markup Language (HTML) or Extensible Markup Language (XML). The access URL is one example of location information which indicates a location of one of the server devices 70-90 which is to be accessed by the MFP 10 in a start of use of the service. It is noted that the service-use-information storage area 36 may store character strings indicating the respective services, instead of the interface definition file. In this configuration, the service list display screen may contain the character strings instead of the service icons.

As illustrated in FIG. 2B, the first storage area 37 of the MFP 10 stores Certification Authority (CA) certificate data and key information for identifying the CA certificate data, in a state in which the CA certificate data and the key information are associated with each other. The CA certificate data is issued by a certification authority (CA) to verify server certificate data provided by the server devices 70-90. The CA certificate data stored in the first storage area 37 is preinstalled in manufacture of the MFP 10, for example.

The CA certificate data includes: an issuer of a certificate (corresponding to Issuer defined according to ITU-TX.509); a common name (corresponding to Common Name defined according to ITU-TX.509); a name of organization (corresponding to Organizational Unit defined according to ITU-TX.509); a period of validity of the certificate (corresponding to Validity defined according to ITU-TX.509); and CA's public key data, for example. The key information is constituted by information contained in the CA certificate data. The key information contains the common name or the name of organization, for example. The CA certificate data and the server certificate data correspond to a format of a digital certificate which is defined according to ITU-TX.509, for example.

As illustrated in FIG. 2C, the second storage area 38 of the MFP 10 stores the CA certificate data, the key information, the service ID, and last access date and time in association with each other. The last access date and time are one example of date and time information which indicates date and time at which corresponding CA certificate data is most recently used for verification of the server certificate data. The second storage area 38 is assigned with a memory size which allows the second storage area 38 to store N (which is a natural number) sets of the CA certificate data, more specifically, N rows of records illustrated in FIG. 2C. The second storage area 38 may store: the CA certificate data and the service ID received from the relay device 50; and the key information extracted from the CA certificate data. It is noted that the second storage area 38 constituted by the RAM stores no data or information at a point in time when the MFP 10 is turned on.

Figure 4:
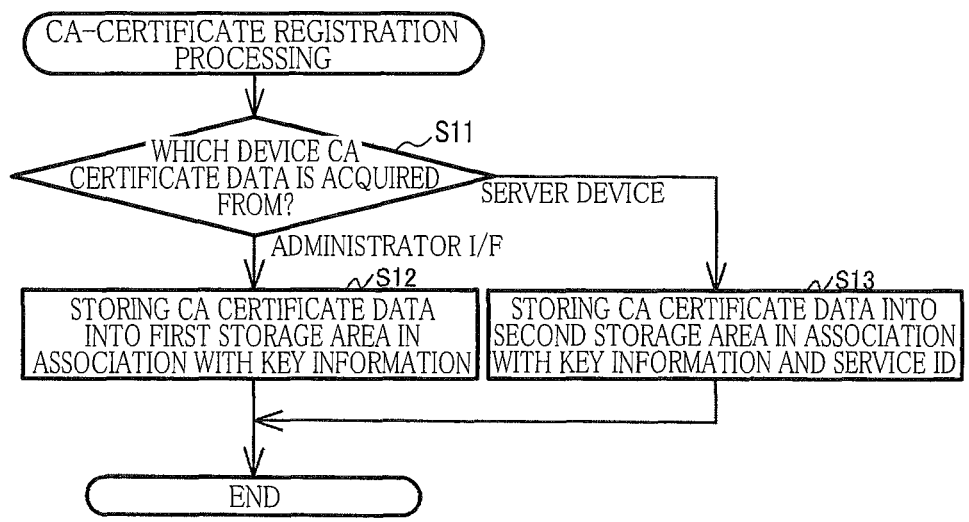
FIG. 4 is a flow chart illustrating a CA-certificate registration processing.

As illustrated in FIG. 3A, the first storage area 66 of the relay device 50 stores the CA certificate data and the key information in association with each other. As illustrated in FIG. 3B, the second storage area 67 of the relay device 50 stores the CA certificate data, the key information, and the service ID in association with each other. The CA certificate data is stored into the data storage area 62B and registered in a CA-certificate registration processing illustrated in FIG. 4, for example. The CA-certificate registration processing illustrated in FIG. 4 is for example executed by the control program 65 of the relay device 50. The CA-certificate registration processing is one example of a registration processing.

CA-Certificate Registration Processing

When the control program 65 receives the CA certificate data from the administrator of the relay device 50 via an administrator I/F (S11: ADMINISTRATOR I/F), the control program 65 at S12 stores the acquired CA certificate data and the key information extracted from the CA certificate data, into the first storage area 66 in a state in which the acquired CA certificate data and the key information are associated with each other. The administrator I/F is constituted by a combination of the display device 53 and the operation device 54 of the relay device 50, for example. In this specification, a "when" clause indicates that in the case where a condition indicated by the "when" clause is satisfied, a processing described after the "when" clause is executed. It is noted that the processing may be executed at any timing after the condition is satisfied, and may not be executed immediately after the condition is satisfied.

When the control program 65 receives the CA certificate data and the service ID from the server device 90 via the communication device 55 (S11: SERVER DEVICE), the control program 65 at S13 stores the received CA certificate data and service ID and the key information extracted from the CA certificate data, into the second storage area 67 in a state in which the received CA certificate data and service ID and the key information are associated with each other. It is noted that the CA certificate data to be stored in the second storage area 67 may be acquired in any manner. For example, an administrator of the server device 90 may operate a terminal device different from the server device 90 such that the terminal device displays a reception screen for uploading the CA certificate data to the relay device 50, and may then upload the CA certificate data to the relay device 50 by operating the reception screen. The control program 65 may then store the CA certificate data received via the reception screen, into the second storage area 67.

It is noted that the first storage area 37 of the MFP 10 and the first storage area 66 of the relay device 50 store only CA certificate data issued by a public CA, for example. The second storage area 67 of the relay device 50 may store only CA certificate data issued by a private CA, for example, and may store the CA certificate data issued by the public CA in addition to the CA certificate data issued by the private CA, for example. The second storage area 38 of the MFP 10 may store the CA certificate data stored in the first storage area 66 or the second storage area 67 of the relay device 50. It is noted that the kinds of the CA certificate data stored in each of the storage areas 37, 38, 66, 67 are not limited to those in the above-described example. For example, the CA certificate data issued by the private CA may be further stored into the first storage areas 37, 66. Also, the first storage areas 37, 66 and the second storage areas 38, 67 may not be distinguished from each other.

The public CA is a CA highly trusted by its publication of the Certification Practice Statement, for example. Examples of public CAs include CAs founded by, e.g., GMO Global Sign Inc. and Symantec Website Security GK. The private CA is a CA established by the administrator of the server device 90 with own operational standards, for example. However, the public CA and the private CA are not distinguished uniquely, and a manufacturer of the MFP 10 or the administrator of the relay device 50 may distinguish the public CA and the private CA as needed.

Operations in Service Performing System 100

There will be next explained operations in the service performing system 100 with reference to FIGS. 5-8. In the service performing system 100 according to the present embodiment, when using the service provided by any one of the server devices 70-90, the MFP 10 uses the CA certificate data stored in the data storage area 32B or the CA certificate data received from the relay device 50, to verify the server certificate data received from the server device (noted that this verification corresponds to "validate" in SSL).

This flow begins with S21 at which the control program 35 of the MFP 10 establishes connection with the relay device 50, following a procedure according to XMPP over BOSH. It is noted that this connection may be hereinafter referred to as "XMPP connection". The XMPP connection is connection for transmission of a request from the relay device 50 to the MFP 10 (noted that this operation corresponds to what is called server push). It is noted that the XMPP connection is disconnected when a predetermined connection maintaining period has passed. When a re-connection period shorter than the connection maintaining period has passed, the control program 35 establishes the XMPP connection with the relay device 50. The XMPP connection is kept established by the MFP 10 during execution of processings in FIGS. 5-7, for example.

When the control program 65 of the relay device 50 at S22 has received the external service use information from the server device 90 via the communication device 55, the control program 65 at S23 transmits the external service use information to the MFP 10 via the communication device 55. The relay device 50 and the MFP 10 at S23 transfer the external service use information through the XMPP connection. The processings at S22 and S23 are one example of a relay processing.

The external service use information may contain a plurality of access URLs and a plurality of service IDs respectively corresponding to the access URLs. The external service use information may contain the service use instruction instead of the interface definition file. The service use instruction is for causing the MFP 10 to start using the external service that is available according to the external service use information. The external service use information in this case at least needs to contain an access URL and a service ID corresponding to the service used according to the service use instruction.

Figure 8:
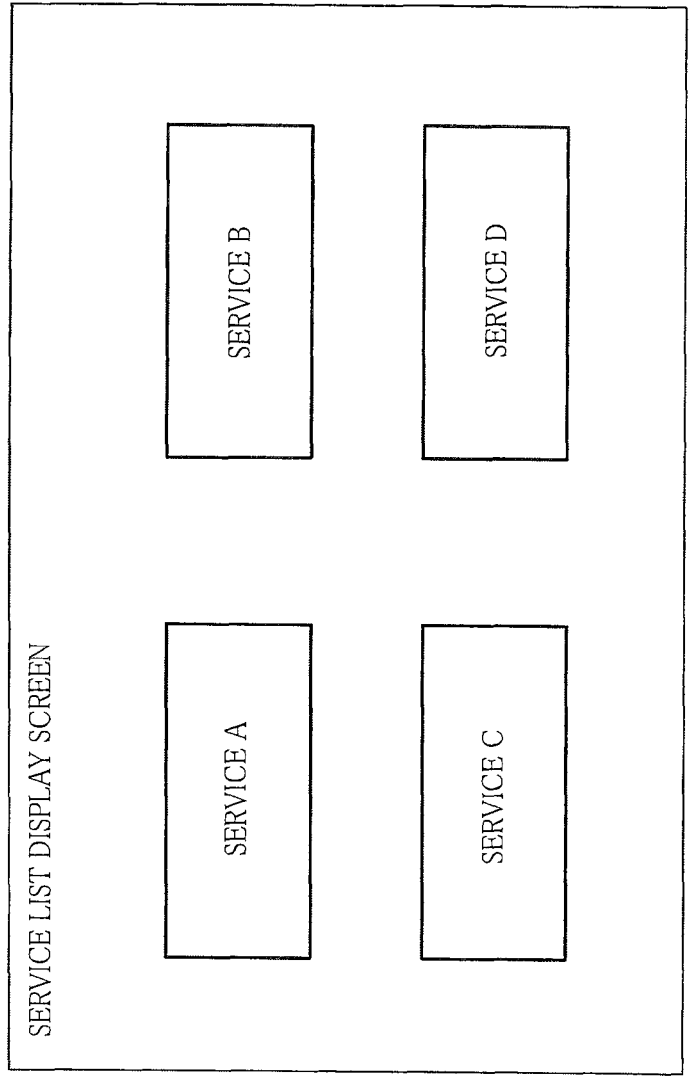
FIG. 8 is a view illustrating one example of a service list display screen.

At S23, the control program 35 of the MFP 10 receives the external service use information from the relay device 50 via the communication device 25. The processing in which the control program 35 at S23 receives the external service use information is one example of a first reception process. When the interface definition file is contained in the external service use information received from the relay device 50 via the communication device 25, in other words, when the service use instruction is not contained in the external service use information (S24: No), the control program 35 at S25 displays the service list display screen on the display device 23. The screen illustrated in FIG. 8 is one example of the service list display screen. The service list display screen illustrated in FIG. 8 contains: the interface definition files stored in the service-use-information storage area 36; and the service icons defined by the respective interface definition files contained in the external service use information. A name of each service is described on a corresponding one of the service icons, and this name of the service is one example of information identifying a corresponding service.

When the operation device 24 has accepted a user operation of tapping on one of the plurality of service icons displayed on the service list display screen (S26: Yes), the control program 35 at S27 controls the communication device 25 to transmit a request of connection to a corresponding one of the server devices 70-90. Specifically, the control program 35 requests Hypertext Transfer Protocol Secure (HTTPS) connection to the access URL corresponding to the service icon tapped at S26. In the present embodiment, a service A is the name of the service provided by the server device 70, a service B is the name of the service provided by the server device 80, and each of a service C and a service D is the name of the service provided by the server device 90. The operation of tapping on the service icon at S26 is one example of an input of the service use instruction for instructing the start of use of the corresponding service.

When the service use instruction is contained in the external service use information received from the relay device 50 via the communication device 25, in other words, when the interface definition file is not contained in the external service use information (S24: Yes), this flow goes to S27 by skipping S25 and S26. The control program 35 at S27 controls the communication device 25 to request HTTPS connection to the server device 90.

When having received the request of connection from the MFP 10 (S27), the corresponding one of the server devices 70, 80 at S28 sends the MFP 10 the server certificate data on the corresponding one of the server devices 70, 80, as a portion of an SSL negotiation processing in the HTTPS communication. It is noted that this server certificate data may be hereinafter referred to as "particular server certificate data". Likewise, when having received the request of connection from the MFP 10 (S27), the server device 90 at S28 sends the MFP 10 the server certificate data on the server device 90, as a portion of the SSL negotiation processing in the HTTPS communication. It is noted that this server certificate data may be hereinafter referred to as "external server certificate data".

Each server certificate data is issued by the CA and set for a corresponding one of the server devices 70-90 to prove that the corresponding server device is a trusted device. The particular server certificate data is issued by the public CA in the present embodiment. The external server certificate data may be issued by the public CA or the private CA.

The server certificate data contains: server's public key data; key information identifying the CA certificate data for verification of the server certificate data; and signature data, for example. The signature data is created, for example, by encrypting the server's public key data using CA's private key data corresponding to the CA's public key data contained in the CA certificate data identified by the key information. It is noted that the key information contained in the server certificate data at least needs to uniquely identify the CA certificate data stored in the first storage areas 37, 66 and the second storage areas 38, 67 and may not completely coincide with the key information stored in the first storage areas 37, 66 and the second storage areas 38, 67.

When having received the server certificate data from the corresponding one of the server devices 70-90 via the communication device 25 (S28), the control program 35 of the MFP 10 executes a series of processings for verifying the server certificate data (noted that these processings may be hereinafter referred to as "verification processing"). The processing for receiving the external server certificate data at S28 is one example of a second reception process.

Figure 5:
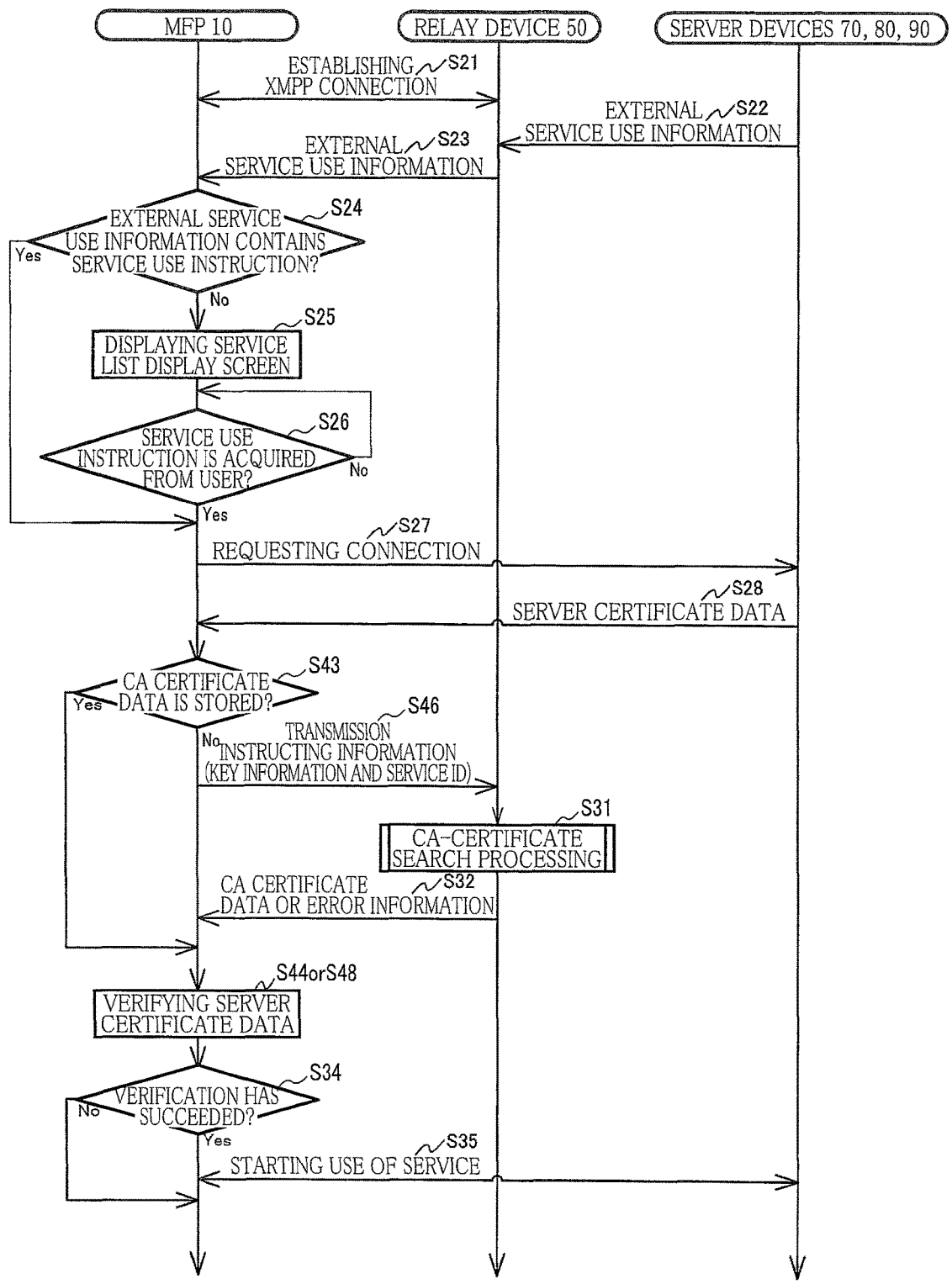
FIG. 5 is a flow chart illustrating operations in the service performing system.
Figure 6:
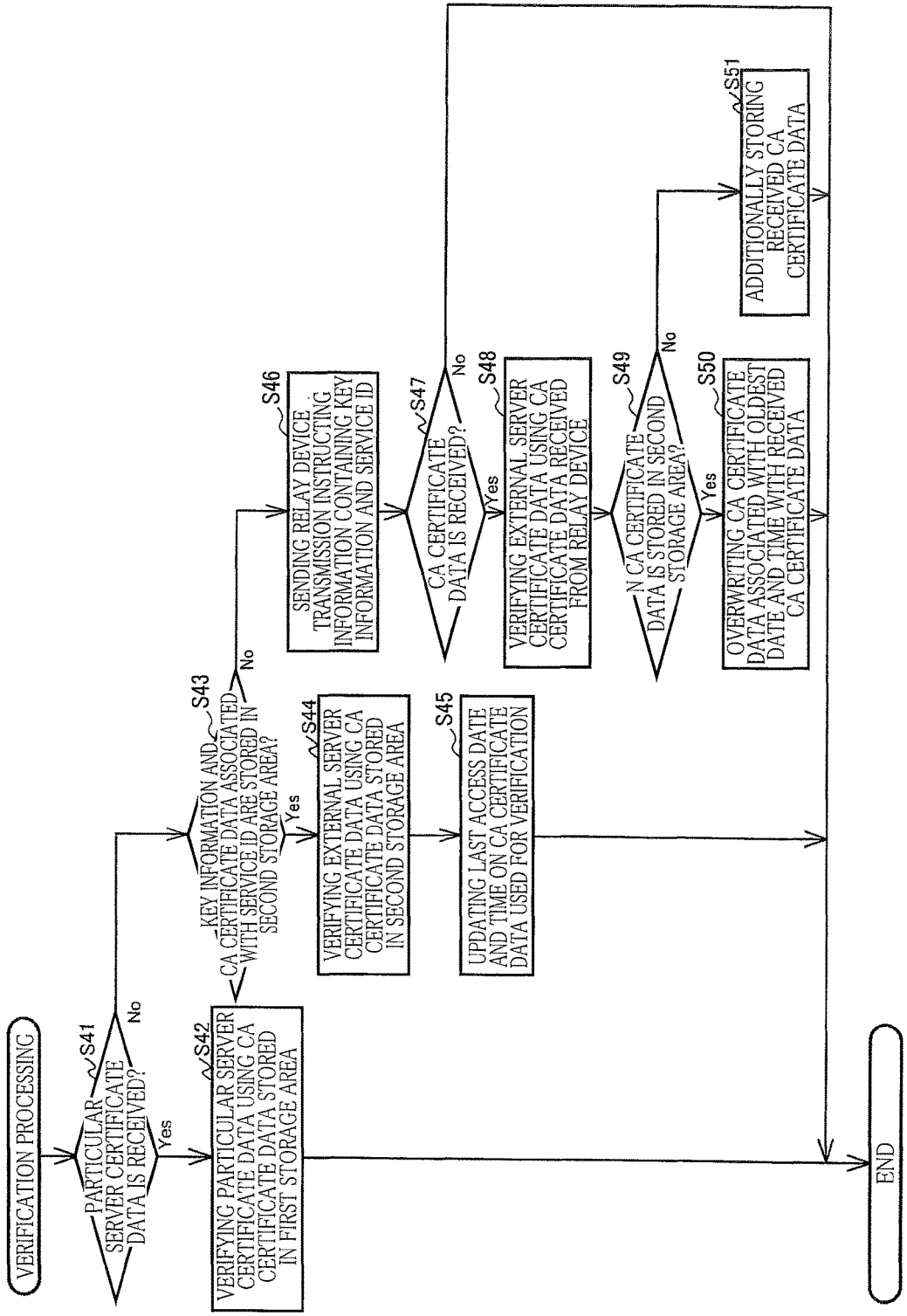
FIG. 6 is a flow chart illustrating a verification processing.
Figure 7:
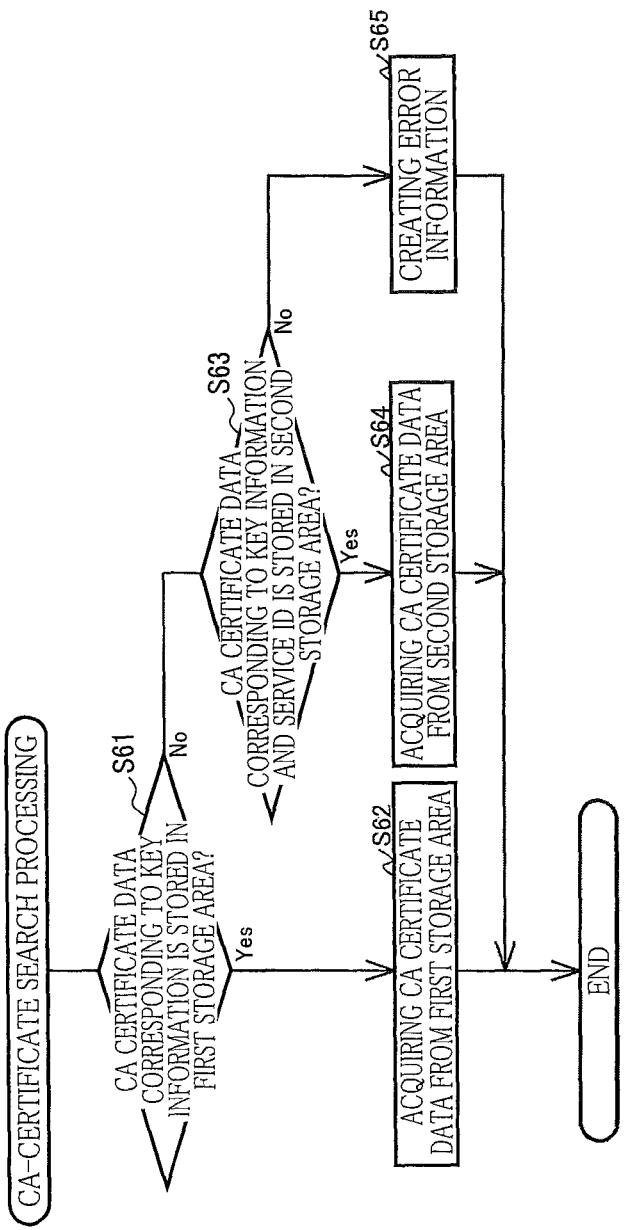
FIG. 7 is a flow chart illustrating a CA-certificate search processing.

There will be next explained the verification processing with reference to FIG. 6. It is noted that FIG. 5 partly illustrates the verification processing, specifically, FIG. 5 illustrates processings at S43, S46, and S44 or S48 in the verification processing. When having received the particular server certificate data at S28 (S41: Yes), the control program 35 at S42 uses the CA certificate data stored in the first storage area 37 to verify the particular server certificate data, and this flow ends. The control program 35 at S42 acquires, from the first storage area 37, the CA certificate data associated with the key information contained in the particular server certificate data. The control program 35 then uses the CA's public key data contained in the acquired CA certificate data to decrypt the signature data contained in the particular server certificate data. The control program 35 compares the server's public key data contained in the particular server certificate data with decryption public key data obtained by decrypting the signature data. The processing at S42 is one example of a third verification process.

When having received the external server certificate data at S28 (S41: No), the control program 35 at S43 determines whether the CA certificate data for verifying the external server certificate data is stored in the second storage area 38 or not. Specifically, the control program 35 at S43 determines whether the key information contained in the external server certificate data and the CA certificate data associated with the service ID contained in the external service use information are stored in the second storage area 38 or not. The processing at S43 is one example of a determination process.

When the CA certificate data for verification of the external server certificate data is stored in the second storage area 38 (S43: Yes), the control program 35 at S44 uses the CA certificate data to verify the external server certificate data. The external server certificate data may be verified in the same method as used at S42. The processing at S44 is one example of a first verification process. The control program 35 at S45 updates, to a current date and time, the last access date and time stored in the second storage area 38 so as to be associated with the CA certificate data used for verification at S44, and this flow ends.

When the CA certificate data for verification of the external server certificate data is not stored in the second storage area 38 (S43: No), the control program 35 at S46 controls the communication device 25 to transmit transmission instructing information to the relay device 50. The transmission instructing information is information for instructing the relay device 50 to transmit the CA certificate data for verification of the external server certificate data. The transmission instructing information contains the key information contained in the external server certificate data and the service ID contained in the external service use information, for example.

When having received the transmission instructing information from the MFP 10 via the communication device 55 (S46), the control program 65 of the relay device 50 at S31 executes a CA-certificate search processing. In the CA-certificate search processing, the control program 65 searches for the CA certificate data identified by the transmission instructing information, from the CA certificate data stored in the first storage area 66 and the second storage area 67. The CA-certificate search processing will be explained in detail with reference to a flow in FIG. 7.

This flow begins with S61 at which the control program 65 determines whether the CA certificate data associated with the key information contained in the transmission instructing information is stored in the first storage area 66 or not. When the CA certificate data is not stored in the first storage area 66 (S61: No), the control program 65 at S63 determines whether the CA certificate data associated with the key information and the service ID contained in the transmission instructing information is stored in the second storage area 67 or not.

When the CA certificate data is stored in the first storage area 66 (S61: Yes), the control program 65 at S62 acquires the CA certificate data from the first storage area 66. When the CA certificate data is not stored in the first storage area 66 and the CA certificate data is stored in the second storage area 67 (S63: Yes), the control program 65 at S64 acquires the CA certificate data from the second storage area 67. When the CA certificate data is not stored in the first storage area 66 and the CA certificate data is not stored in the second storage area 67 (S63: No), the control program 65 at S65 creates error information. The error information indicates that the CA certificate data identified by the transmission instructing information is not registered in the relay device 50.

The control program 65 at S32 controls the communication device 55 to transmit the CA certificate data acquired from the first storage area 66 at S62, the CA certificate data acquired from the second storage area 67 at S64, or the error information created at S65, to the MFP 10. The processing at S32 is one example of a transmission processing.

Returning to FIG. 6, when the CA certificate data is received from the relay device via the communication device 25 (S47: Yes), the control program 35 of the MFP 10 at S48 uses the CA certificate data to verify the external server certificate data. The external server certificate data may be verified in the same method as used at S42 and S44. The processings at S46-S48 are one example of a second verification process.

The control program 35 at S49 checks the number of the CA certificate data stored in the second storage area 38. When the N sets of the CA certificate data are stored in the second storage area 38 (S49: Yes), the control program 35 at S50 overwrites the key information, the service ID, and the CA certificate data stored in the second storage area 38 so as to be associated with the oldest last access date and time, respectively with the key information and the service ID contained in the transmission instructing information and the CA certificate data received at S47. Also, the control program 35 at S50 updates the last access date and time to the current date and time, and this flow ends.

The overwriting at S50 is not limited to writing of the CA certificate data newly received, into a memory area of the second storage area 38 which had stored the oldest CA certificate data. For example, the second storage area 38 may store flags in association with the respective CA certificate data such that each of the flags indicates whether a corresponding one of the CA certificate data is to be searched at S43 or not. In the present embodiment, each flag is ON when the corresponding CA certificate data is to be searched, and each flag is OFF when the corresponding CA certificate data is not to be searched. For example, the control program 35 at S50 sets the flag corresponding to the oldest CA certificate data, to OFF and sets the flag corresponding to the CA certificate data newly stored in the second storage area 38, to ON.

The number of the CA certificate data stored in the second storage area 38 is less than N (S49: No), the control program 35 at S51 additionally stores (i) the key information and the service ID contained in the transmission instructing information, (ii) the CA certificate data received at S47, and (iii) the current date and time, into the second storage area 38 in association with each other, and this flow ends. Specifically, the control program 35 at S51 stores the CA certificate data newly received, into a memory area of the second storage area 38 which differs from a memory area thereof in which the CA certificate data has already been stored. The processings at S49-S51 are one example of a storage control process.

When the control program 35 has received the error information from the relay device via the communication device 25 (S47: No), this flow ends. It is noted that the transmission of the transmission instructing information at S46 and the reception of the CA certificate data or the error information at S47 may be performed through the XMPP connection and may be performed through connection, different from the XMPP connection, which is newly established with the relay device 50.

When the control program 35 at S44 or S48 determines that a value obtained by hashing the content of the server certificate coincides with data obtained by decrypting the signature data with the public key contained in the CA certificate data, the control program 35 at S34 determines that the verification is succeeded. When the control program 35 at S33 determines that the value obtained by hashing the content of the server certificate does not coincide with the data obtained by decrypting the signature data, the control program 35 at S34 determines that the verification is failed. When the verification of the server certificate data is succeeded (S34: Yes), the control program 35 at S35 starts using the service indicated according to the service use instruction determined or acquired at S24 or S26. When the verification of the server certificate data is failed (S34: No), this flow skips S35.

The control program 35 at S35 uses the server's public key data to encrypt a pre-master-secret value used for the service to be used and controls the communication device 25 to transmit the encrypted pre-master-secret value to one of the server devices 70-90 which provides the service, for example. When having received the encrypted pre-master-secret value from the MFP 10, the server device decrypts the encrypted pre-master-secret value using server's private key data corresponding to the server's public key data. The MFP 10 and the server device generate a common key based on the pre-master-secret value to encrypt data or information to be transmitted and uses the common key to decrypt the received data or information.

Effects

In the above-described embodiment, when the necessary CA certificate data is stored in the data storage area 32B, the control program 35 of the MFP 10 executes the first verification process (S43: Yes, S44) using the CA certificate data, and when the necessary CA certificate data is not stored in the data storage area 32B, the control program 35 acquires the CA certificate data from the relay device 50 to execute the second verification process (S44: No, S46-S48). This configuration allows the MFP 10 to use a multiplicity of services without the CA certificate data clattering a memory area of the data storage area 32B.

In the above-described embodiment, the data storage area 32B is divided into the first storage area 37 and the second storage area 38. Thus, the CA certificate data for verification of the particular server certificate data and the CA certificate data for verification of the external server certificate data can be separately stored. This configuration can prevent overwriting of the preinstalled CA certificate data with the CA certificate data received from the relay device 50 via the communication device 25. Also, it is possible to prevent the particular server certificate data from being verified using the CA certificate data acquired from the relay device 50.

In the above-described embodiment, a memory area for storing the N sets of the CA certificate data can be provided as the second storage area 38. This configuration eliminates the need for increasing an amount of storage of the storage device 32 to store the CA certificate data. Also, the first storage area 37 is constituted by the ROM, thereby always keeping the CA certificate data for verification of the particular server certificate data. The second storage area 38 is constituted by the RAM, requiring a lower cost to provide a storage area for the CA certificate data acquired from the relay device 50. Also, the control program 35 at S50 overwrites the CA certificate data associated with the oldest last access date and time, resulting in reduction of a frequency of acquisition of the CA certificate data from the relay device 50.

In the above-described embodiment, the control program 35 at S46 sends the relay device 50 the transmission instructing information containing the service ID to acquire, from the relay device 50, the CA certificate data associated with the service ID contained in the external service use information. This configuration can reduce a possibility in which the MFP 10 communicates with another device having spoofed the server device 90.

It is noted that data structure of each of the first storage areas 37, 66 and the second storage areas 38, 67 is not limited to one illustrated in FIGS. 2 and 3. For example, the key information may be omitted. Each of the control programs 35, 65 may at S42, S43, S61, and S63 analyze the CA certificate data stored in a corresponding one of the storage areas 37, 38, 66, 67 to identify the CA certificate data corresponding to the key information. Also, the control program 35 may at S43 further determine whether the CA certificate data corresponding to the key information is stored in the first storage area 37 or not.

In the MFP 10 or the relay device 50 in the above-described embodiment, the CPUs 31, 61 execute various programs stored in the program storage areas 32A, 62A of the respective storage devices 32, 62, to execute processings to be executed by the controller. However, the configuration of the controller is not limited to this configuration. For example, the controller may be partly or entirely configured by hardware such as an integrated circuit (IC).

The present invention is achieved by the MFP 10 or the relay device 50 in the above-described embodiment but may be achieved by programs for causing the MFP 10 or the relay device 50 to execute processings. The programs may be stored in a non-transitory storage medium. Examples of the non-transitory storage medium include, in addition to a CD-ROM and a DVD-ROM, a storage device mounted on a server device connectable to the MFP 10 or the relay device 50 over the communication network 102. The programs stored in the storage device of the server device may be distributed, as information or signals representing the programs, over the communication network 102 such as the Internet.

What is claimed is:

1. A client device, comprising:
   a communication device configured to be electrically connected with (i) a server configured to provide a service and (ii) a relay device;
   a storage;
   and a controller configured to execute:
   a first reception process for receiving service use information from the relay device via the communication device;
   a first transmission process for using the service use information received in the first reception process, to transmit connection request information to the server via the communication device;
   a second reception process for receiving, via the communication device, server certificate data which is transmitted from the server as a response to the connection request information;
   a determination process for determining whether certificate-authority certificate data is stored in the storage, the certificate-authority certificate data being for verification of server certificate data which is provided by the server;
   a first verification process for verifying the server certificate data using the certificate-authority certificate data when the controller determines in the determination process that the certificate-authority certificate data is stored in the storage;
   a third reception process for receiving the certificate-authority certificate data from the relay device via the communication device when the controller determines in the determination process that the certificate-authority certificate data is not stored in the storage;
   a second verification process for verifying the server certificate data using the certificate-authority certificate data received in the third reception process;
   and a storage control process for storing the certificate-authority certificate data received in the third reception process, into the storage.

2. The client device according to claim 1, further comprising a plurality of servers each as the server,
   wherein the plurality of servers are configured to respectively provide a plurality of services different from each other, and the plurality of servers comprise a first server and a second server different from the first server, wherein the plurality of services comprise: a first service provided by the first server and accepted by the relay device in advance; and a second service provided by the second server and not accepted by the relay device in advance, wherein the storage comprises a first storage area and a second storage area different from the first storage area, wherein the controller is further configured to execute the storage control process for storing first certificate-authority certificate data in the first storage area and storing second certificate-authority certificate data in the second storage area, wherein the first certificate-authority certificate data is for verification of first server certificate data provided by the first server, and wherein the second certificate-authority certificate data is for verification of second server certificate data provided by the second server.

3. The client device according to claim 2, wherein in response to receiving the second server certificate data in the second reception process, the controller is configured to determine in the determination process whether corresponding certificate-authority certificate data is stored in the second storage area, wherein the corresponding certificate-authority certificate data is the second certificate-authority certificate data corresponding to the received second server certificate data, wherein when the controller determines in the determination process that the corresponding certificate-authority certificate data is stored in the second storage area, the controller is configured to use the corresponding certificate-authority certificate data to verify the received second server certificate data in the first verification process, wherein when the controller determines in the determination process that the corresponding certificate-authority certificate data is not stored in the second storage area, the controller is configured to:
  receive the corresponding certificate-authority certificate data from the relay device via the communication device in the third reception process;
  verify the received second server certificate data using the corresponding certificate-authority certificate data received in the second verification process; and
  store the received corresponding certificate-authority certificate data into the second storage area as the second certificate-authority certificate data in the storage control process.

4. The client device according to claim 2, wherein the controller is further configured to execute the storage control process for storing the second certificate-authority certificate data associated with date and time information in the second storage area, wherein the date and time information indicates date and time at which the second certificate-authority certificate data is most recently used for verification of the second server certificate data, and wherein the controller is further configured to execute the storage control process in which the controller stores N sets of the second certificate-authority certificate data, where N is a natural number, and the controller overwrites the second certificate-authority certificate data associated with the date and time information that is oldest among the date and time information stored in the second storage area, with corresponding certificate-authority certificate data received in the third reception process as the second certificate-authority certificate data.

5. The client device according to claim 2, wherein in response to receiving the first server certificate data in the second reception process, the controller is configured to execute a third verification process for verifying the received first server certificate data using the first certificate-authority certificate data stored in the first storage area.

6. The client device according to claim 2, wherein the first storage area is a non-transitory storage area, and wherein the second storage area is a transitory storage area.

7. The client device according to claim 1, wherein when the controller determines in the determination process that the certificate-authority certificate data is not stored in the storage, the controller is configured to execute a second transmission process for transmitting transmission instructing information to the relay device via the communication device, and the transmission instructing information contains key information which identifies the certificate-authority certificate data, and wherein in the third reception process, the controller is configured to receive, from the relay device via the communication device, the certificate-authority certificate data transmitted from the relay device as a response to the transmission instructing information.

8. The client device according to claim 7, wherein the service use information comprises a service identifier which identifies the service, wherein in the second transmission process, the controller is configured to transmit the transmission instructing information containing the key information and the service identifier, to the relay device via the communication device, and wherein in the storage control process, the controller is configured to store, into the storage, (i) the service identifier transmitted in the second transmission process and (ii) the certificate-authority certificate data received in the third reception process and corresponding to the service identifier.

9. The client device according to claim 7, wherein the key information is contained in the server certificate data and contains one of a common name and a name of organization relating to the certificate-authority certificate data.

10. The client device according to claim 1, wherein before the first reception process, the controller is configured to execute a connection establishing process for establishing connection between the client device and the relay device, and wherein in the first reception process, the controller is configured to receive the service use information from the relay device through the connection.

11. A client device, comprising:
a communication device configured to be electrically connected with a server and a relay device;
a storage;
a controller; and
a plurality of servers each as the server,
the plurality of servers being configured to respectively provide a plurality of services different from each other, the plurality of servers comprising a first server and a second server different from the first server, the plurality of services comprising: a first service provided by the first server and accepted by the relay device in advance; and a second service provided by the second server and not accepted by the relay device in advance, the storage comprising a first storage area and a second storage area different from the first storage area, the controller being configured to:
store, in the storage, certificate-authority certificate data for verification of server certificate data which is provided by the server;
store first certificate-authority certificate data in the first storage area; and
store second certificate-authority certificate data in the second storage area, the first certificate-authority certificate data being for verification of first server certificate data provided by the first server, the second certificate-authority certificate data being for verification of second server certificate data provided by the second server, the controller being configured to execute:
a first reception process for receiving service use information from the relay device via the communication device;
a first transmission process for using the service use information received in the first reception process, to transmit connection request information to the server via the communication device;
a second reception process for receiving, via the communication device, the server certificate data which is transmitted from the server as a response to the connection request information; and
a verification process for verifying the server certificate data received in the second reception process, using the certificate-authority certificate data stored in the storage, the controller being configured to:
use the certificate-authority certificate data stored in the first storage area to verify the first server certificate data in the verification process, when the controller receives the service use information corresponding to the first service in the first reception process; and
use the certificate-authority certificate data stored in the second storage area to verify the second server certificate data in the verification process, when the controller receives the service use information corresponding to the second service in the first reception process.

12. A non-transitory storage medium storing a plurality of instructions executable by a processor of a client device, the client device comprising:
a communication device configured to be electrically connected with (i) a server configured to provide a service and (ii) a relay device;
and a storage, the plurality of instructions, when executed by the processor, causing the client device to execute:
a first reception process for receiving service use information from the relay device via the communication device;
a first transmission process for using the service use information received in the first reception process, to transmit connection request information to the server via the communication device;
a second reception process for receiving, via the communication device, the server certificate data which is transmitted from the server as a response to the connection request information;
a determination process for determining whether certificate-authority certificate data is stored in the storage, the certificate-authority certificate data being for verification of server certificate data which is provided by the server;
a first verification process for verifying the server certificate data using the certificate-authority certificate data when the client device determines in the determination process that the certificate-authority certificate data is stored in the storage;
a third reception process for receiving the certificate-authority certificate data from the relay device via the communication device when the client device determines in the determination process that the certificate-authority certificate data is not stored in the storage;
a second verification process for verifying the server certificate data using the certificate-authority certificate data received in the third reception process;
and a storage control process for storing the certificate-authority certificate data received in the third reception process, into the storage.

13. A service performing system, comprising:
a server configured to provide a service;
a client device configured to use the service;
and a relay device, the client device comprising:
a communication device configured to be electrically connected with the server and the relay device;
a storage;
and a controller configured to execute:
a first reception process for receiving service use information from the relay device via the communication device;
a first transmission process for using the service use information received in the first reception process, to transmit connection request information to the server via the communication device;
a second reception process for receiving, via the communication device, the server certificate data which is transmitted from the server as a response to the connection request information;
a determination process for determining whether certificate-authority certificate data is stored in the storage, the certificate-authority certificate data being for verification of server certificate data which is provided by the server;
a first verification process for verifying the server certificate data using the certificate-authority certificate data when the controller determines in the determination process that the certificate-authority certificate data is stored in the storage;
a third reception process for receiving the certificate-authority certificate data from the relay device via the communication device when the controller determines in the determination process that the certificate-authority certificate data is not stored in the storage;
a second verification process for verifying the server certificate data using the certificate-authority certificate data received in the third reception process; and
a storage control process for storing the certificate-authority certificate data received in the third reception process, into the storage.

* * * * *

UNITED STATES PATENT AND TRADEMARK OFFICE
CERTIFICATE OF CORRECTION

PATENT NO.       : 9,628,470 B2
APPLICATION NO.  : 14/722540
DATED            : April 18, 2017
INVENTOR(S)      : Takafumi Mori Page 1 of 1

It is certified that error appears in the above-identified patent and that said Letters Patent is hereby corrected as shown below:

In the Claims

Column 16, Claim 1, Line 40 should read:
device, the server certificate data which is Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*